(12) United States Patent
Ross et al.

(10) Patent No.: US 10,864,880 B2
(45) Date of Patent: Dec. 15, 2020

(54) KNEE AIRBAG MODULE HOUSING WITH SECUREMENT ELEMENT MOUNTING FEATURES

(71) Applicant: Toyota Motor Engineering & Manufacturing North America, Inc., Plano, TX (US)

(72) Inventors: Andrew L. Ross, Ypsilanti, MI (US); Jonathan Quijano, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 40 days.

(21) Appl. No.: 16/293,799

(22) Filed: Mar. 6, 2019

(65) Prior Publication Data

US 2020/0282941 A1    Sep. 10, 2020

(51) Int. Cl.
 *B60R 21/215*    (2011.01)
 *B60R 21/206*    (2011.01)
 *B60R 21/00*    (2006.01)

(52) U.S. Cl.
 CPC .......... *B60R 21/215* (2013.01); *B60R 21/206* (2013.01); *B60R 2021/0051* (2013.01)

(58) Field of Classification Search
 CPC ........................... B60R 21/215; B60R 21/206
 See application file for complete search history.

(56) References Cited

U.S. PATENT DOCUMENTS

| 8,752,859 B2 * | 6/2014 | Morawietz | B60R 21/205 |
| | | | 280/728.2 |
| 10,532,715 B2 * | 1/2020 | Jacqmarcq | B60R 21/2037 |

FOREIGN PATENT DOCUMENTS

| CN | 108001400 A | 5/2018 |
| JP | 2005104207 A | 4/2005 |

* cited by examiner

*Primary Examiner* — Faye M Fleming
(74) *Attorney, Agent, or Firm* — Christopher G. Darrow; Darrow Mustafa PC

(57) ABSTRACT

A housing for a knee airbag module includes an enclosure structured to receive a knee airbag module therein, and a door rotatably coupled to the enclosure. A first securement element mounting hole is formed in the door at a location in the door structured to reside adjacent an outboard edge and a rearmost edge of the door when the door is in an open condition.

8 Claims, 5 Drawing Sheets ical field. In addition, numerous specific details are set forth in order to provide a thorough understanding of the embodiments described herein. However, it will be understood by those of ordinary skill in the art that the embodiments described herein can be practiced without these specific details.

KNEE AIRBAG MODULE HOUSING WITH SECUREMENT ELEMENT MOUNTING FEATURES

TECHNICAL FIELD

The present invention relates generally to vehicle occupant protection mechanisms and, more particularly, to a housing for a vehicle knee airbag module.

BACKGROUND

A knee airbag module housing may be mounted in a vehicle (for example, below the dashboard). A knee airbag module may be mounted in the housing so as to be deployable to protect the lower limbs of a vehicle occupant during a collision event. Various cables and/or wiring harnesses may extend from the housing or may be routed around the housing during or after installation of the housing in the vehicle. It may be cumbersome and difficult to secure these cables and harnesses so that they do not interfere with the user's operation of the vehicle.

SUMMARY

In one aspect of the embodiments described herein, a housing for a knee airbag module is provided. The housing includes an enclosure structured to receive a knee airbag module therein, and a door rotatably coupled to the enclosure. A first securement element mounting hole is formed in the door at a location in the door structured to reside adjacent an outboard edge and a rearmost edge of the door when the door is in an open condition.

In another aspect of the embodiments described herein, a housing for a knee airbag module is provided. The housing includes an enclosure structured for mounting a knee airbag module therein, and a door rotatably coupled to the enclosure. The door has an interior face structured to face into the enclosure when the door is in a closed condition, and an exterior face opposite the interior face and structured to face in a direction away from the enclosure when the door is in the closed condition. A securement element mounting receptacle is formed in the door. The receptacle includes a first wall extending from the door interior face in a direction toward the exterior face, and a first securement element mounting hole extending through the first wall.

DETAILED DESCRIPTION

Figure 1:
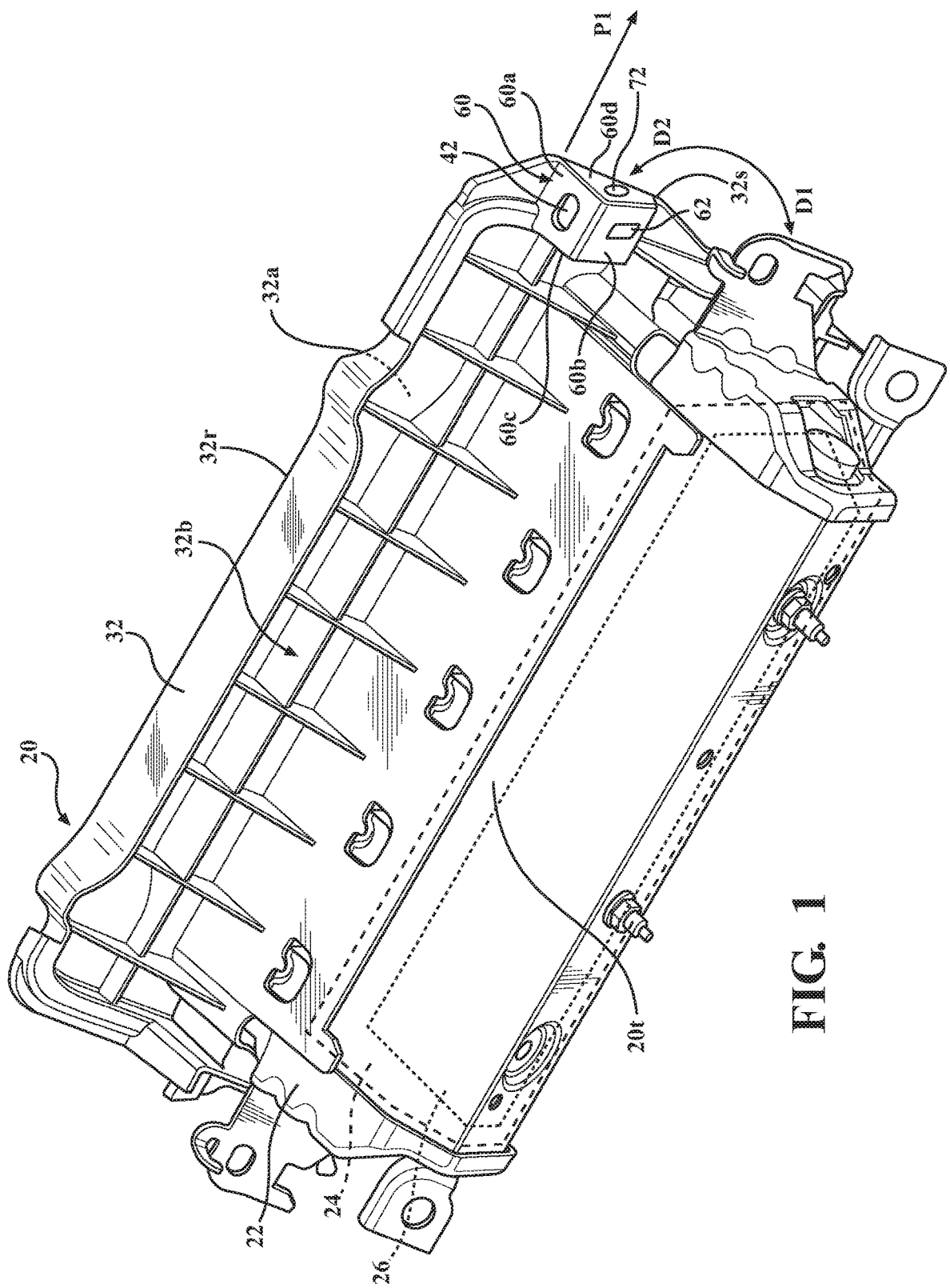
FIG. 1 is a schematic plan perspective view of one embodiment of a housing for a knee airbag module incorporating one or more securement element mounting holes as described herein, and showing a door of the housing in an open condition.

Embodiments described herein relate to a housing for a knee airbag module. The housing includes an enclosure structured for mounting a knee airbag module therein, and a door rotatably coupled to the enclosure. The door has an interior face structured to face into the enclosure when the door is in a closed condition, and an exterior face opposite the interior face and structured to face in a direction away from the enclosure when the door is in the closed condition. A securement element mounting receptacle is formed in the door. The receptacle includes a first wall extending from the door interior face in a direction toward the exterior face, and a first securement element mounting hole extending through the first wall. The first securement element mounting hole enables a securement element to be mounted in the hole, thereby attaching the securement element to the housing door. Attachment of the securement element to the door enables a portion of a wiring harness to be secured to the housing, so secure or immobilize the harness during vehicle use. Alternatively, other elements may be attached or secured to the housing using the securement element.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1A:
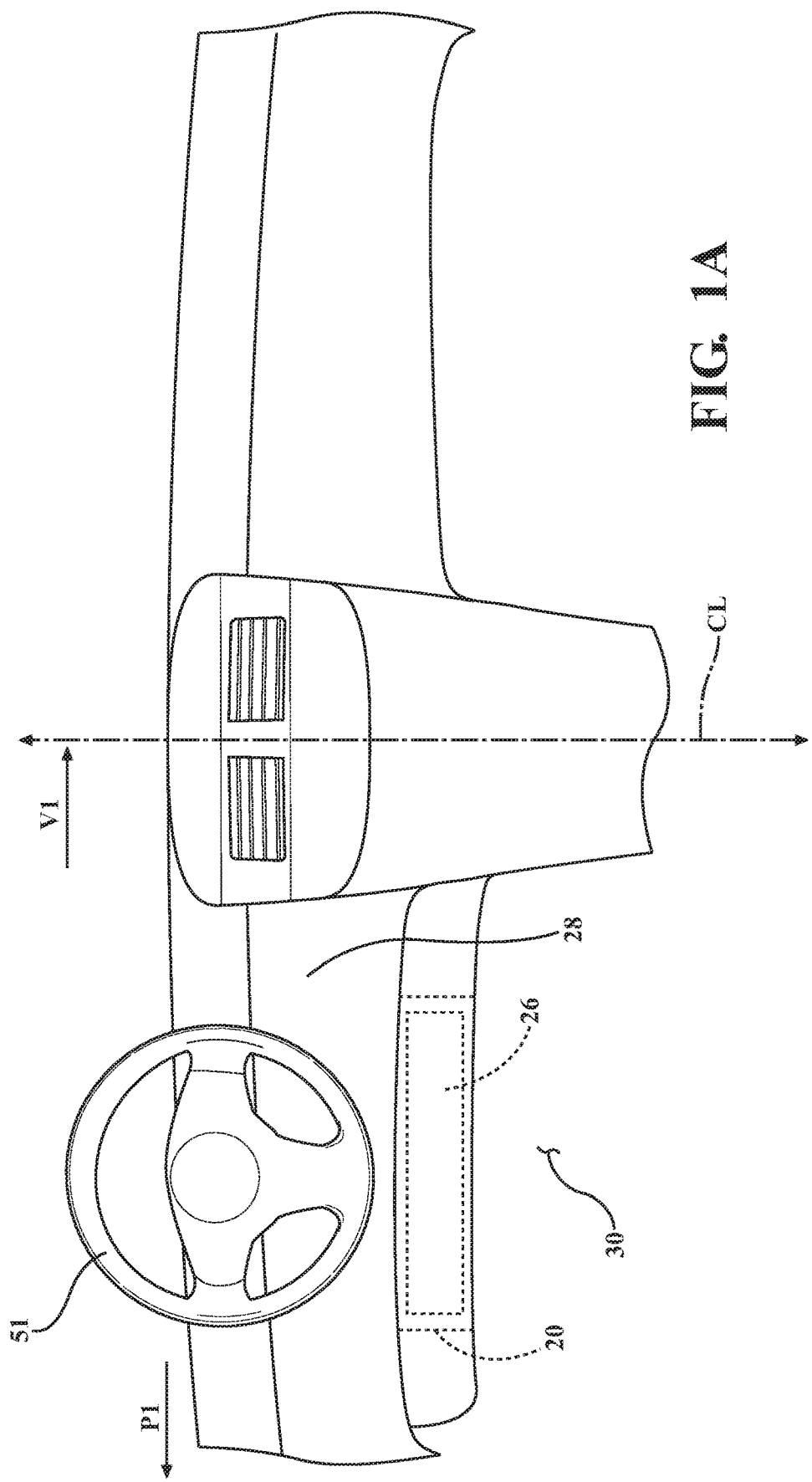
FIG. 1A is a schematic view, facing toward a front of a vehicle, of a housing in accordance with an embodiment described herein mounted in the vehicle.
Figure 2:
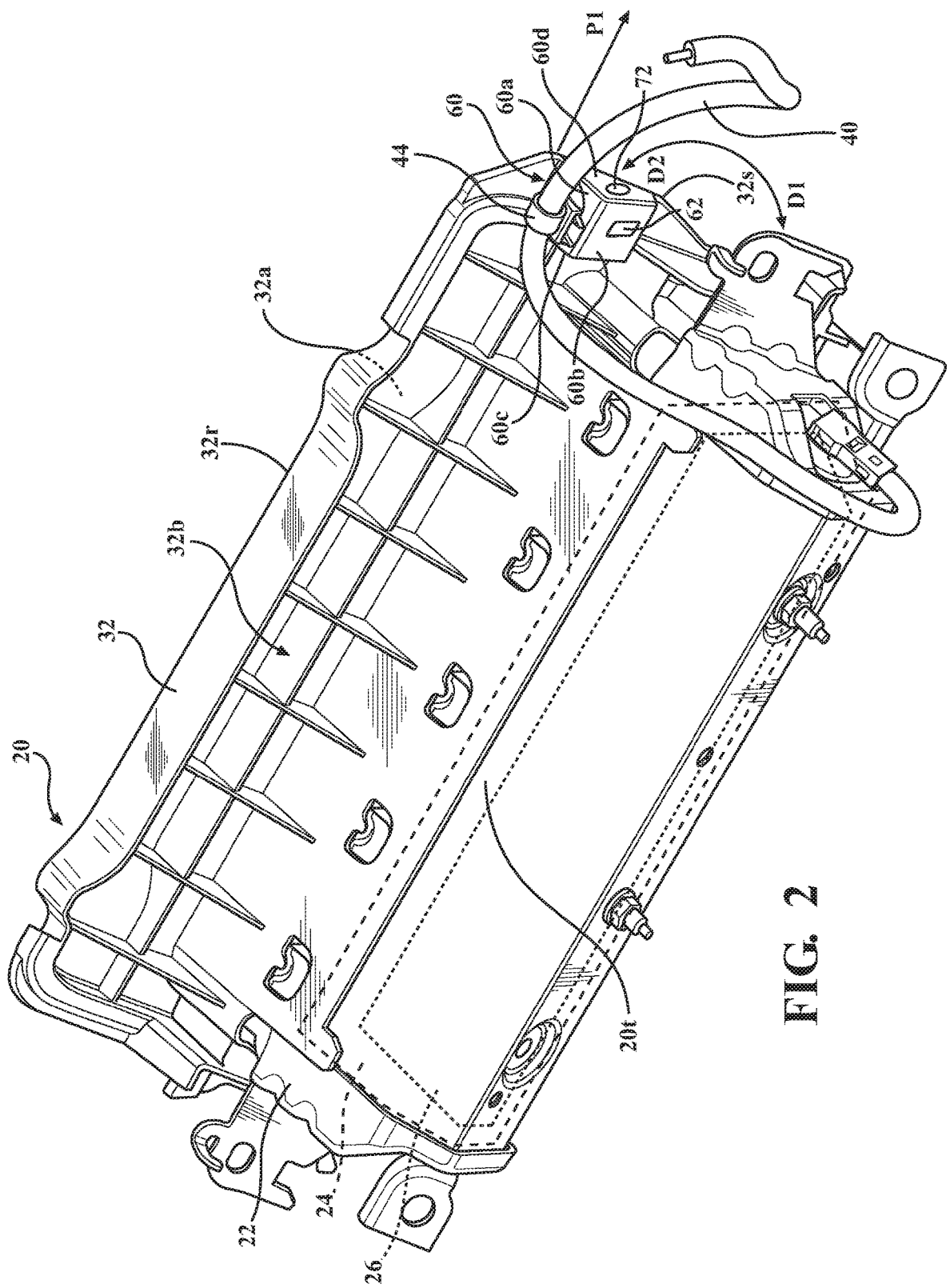
FIG. 2 is the schematic plan perspective view of FIG. 1 also showing the mounting of a securement element in a securement element mounting hole of the housing, and showing the guidance and securement of a wire harness exiting one portion of the housing.

FIG. 1 is a schematic plan perspective view of one embodiment of a housing 20 for a knee airbag module incorporating one or more securement element mounting holes as described herein. Housing 20 may include an enclosure 22 defining a cavity 24 structured for receiving and mounting therein a knee airbag module (generally designated 26). Referring to FIGS. 1 and 1A, as known in the pertinent art, a knee airbag module is designed to minimize injuries to the lower limbs as they make contact with the dashboard or control console 28 during a collision event. The knee airbag module 26 may be mounted above the footwell 30 and the accelerator and brake pedals and under the steering column on the driver side, and under the glovebox on the passenger side. The knee airbag module 26 may include a knee airbag 99 and an inflator (not shown) configured to provide inflation gas for inflating the airbag when activated. Housing 20 may be formed from any suitable material or materials, for example, polymers and/or metallic materials.

The housing 20 may also include a door 32 rotatably coupled to the enclosure 22. In the embodiment shown, the door 32 is mounted above the enclosure opening. However, in certain designs or applications, the housing door 32 may be mounted below the enclosure 22, along an underside of the housing. The door 32 may be rotatable with respect to the enclosure 22 in direction D1, to a closed condition which covers an opening to the enclosure 22 prior to activation of the knee airbag. The door 32 may also be rotatable in direction D2 from the closed condition to an open condition during deployment of the airbag. The housing embodiment shown in FIG. 1 shows door 32 in an open condition (i.e., with the housing enclosure exposed to an exterior of the housing 20).

The door 32 may have an interior face 32a structured to face toward the enclosure cavity 24 when the door 32 is in a closed condition. The door 32 may also have an exterior face 32b residing opposite the interior face 32a and structured to face in an opposite direction from the interior face 32a or otherwise in a direction away from the enclosure cavity 24 when the door 32 is in the closed condition.

In an exemplary deployment scenario, an activation signal may be transmitted along a wiring harness (such as harness 40 shown in FIGS. 2-5, for example) to the inflator, which then activates to fill the airbag with inflation gas. Inflation of the airbag may force the door 32 from the closed condition to the open condition as the expanding airbag deploys from the housing 20.

The door 32 may be formed integrally with the enclosure 22 (for example, by molding) or the door 32 may be formed separately from the enclosure 22 and attached to the enclosure using any suitable method (for example, fasteners).

Referring to FIGS. 1-4, a first securement element mounting hole 42 may be formed in the door 32. First securement element mounting hole 42 is structured to enable attachment of a first securement element 44 to the housing 20. The first securement element 44 may aid in securing another element having a portion which extends from (or into) the enclosure 22. One example of such another element is a wiring harness 40 as described herein, where the harness 40 extends from the inflator of the airbag module located within the enclosure cavity 24. The first securement element 44 may also enable attachment to the housing 20 of another element separate from the housing.

In the embodiment shown, the first securement element mounting hole 42 may be formed at a location adjacent both an outboard edge 32s and a rearmost edge 32r of the door 32 when the door is in an open condition. However, other locations of the first securement element mounting hole 42 on the door 32 are also possible. The outboard edge 32s of the door 32 may be an edge located in a farthest outboard direction P1 of the vehicle (i.e., a direction extending from a vertical centerline CL plane of the vehicle through which a fore-aft axis of the vehicle extends, toward a side of the vehicle). An inboard direction V1 extends opposite the outboard direction P1. The rearmost edge 32r of the door 32 may be an edge of the door extending farthest in a direction toward a rear end of the vehicle when the door is in the open condition. In the view of FIG. 1A, the knee airbag housing 20 is shown mounted at a level below the vehicle steering wheel 51.

FIGS. 2-5 show one possible embodiment of a securement element 44 in the form of a clip structured to support a wiring harness 40 extending from the airbag module inflator and from the housing 20. The clip 44 may be structured to secure the harness 40 to enable the harness to be fed or guided in a particular direction after exiting the housing 20, and may also be designed to prevent movement of the harness 40 with respect to the housing 20 during operation of the vehicle.

In one or more arrangements, and as shown in the drawings, the first securement element mounting hole 42 may be structured to enable the securement element 44 to be attached to the door 32 along the exterior face 32b of the door 32, and may enable the wiring harness 40 to be directed and secured along a top surface 20t of the housing 20 after exiting the housing. This may prevent the harness 40 from, for example, falling below the housing 20 into the footwell area 30 where it may interfere with operation of the vehicle accelerator and brake pedals. The first securement element mounting hole 42 located as shown may also be structured to enable securement of the harness 40 at a location where it may be electrically connected to another portion of the vehicle, for purposes of receiving an inflator activation signal.

Referring to FIGS. 1-5, in one or more arrangements, the first securement element mounting hole 42 may be located in a securement element mounting receptacle (generally designated 60) formed in the door 32. Receptacle 60 may include a first wall 60a extending from the door interior face 32a in a direction toward the exterior face 32b of the door 32. The first securement element mounting hole 42 may extend through the first wall 60a. In addition, the receptacle 60 may further include a second wall 60b extending from the door interior face 32a in a direction toward the exterior face 32b of the door 32 and adjoining the first wall 60a. A second securement element mounting hole 62 may extend through the second wall 60b.

A plane R1 of the interior face 32a, the first wall 60a, and the second wall 60b, may combine to define a receptacle cavity 64 therebetween. Referring to the drawings and, in particular to FIGS. 3 and 4, a portion 44a of the securement element 44 may extend past an end of the first securement element mounting hole 42 when the securement element 44 is inserted into first securement element mounting hole 42 and mounted on the door 32. Receptacle cavity 64 may be structured to provide a space into which this portion 44a of the securement element 44 may extend when the securement element 44 is mounted on the door 32. This accommodation space prevents the portion 44a of the securement element 44 from projecting past the plane R1 of the interior face 32a, where it could be contacted by the deploying airbag, possibly abrading or puncturing the airbag as it deploys. Also, because the harness 40 is secured to the door along the exterior face 32b of the door 32 and the portion 44a of the first securement element 44 extending through the first wall 60a resides within the receptacle cavity 64, no portion of the first securement element 44 projects from beyond the door interior face plane R1 or otherwise comes into contact with the deploying airbag.

Figure 6:
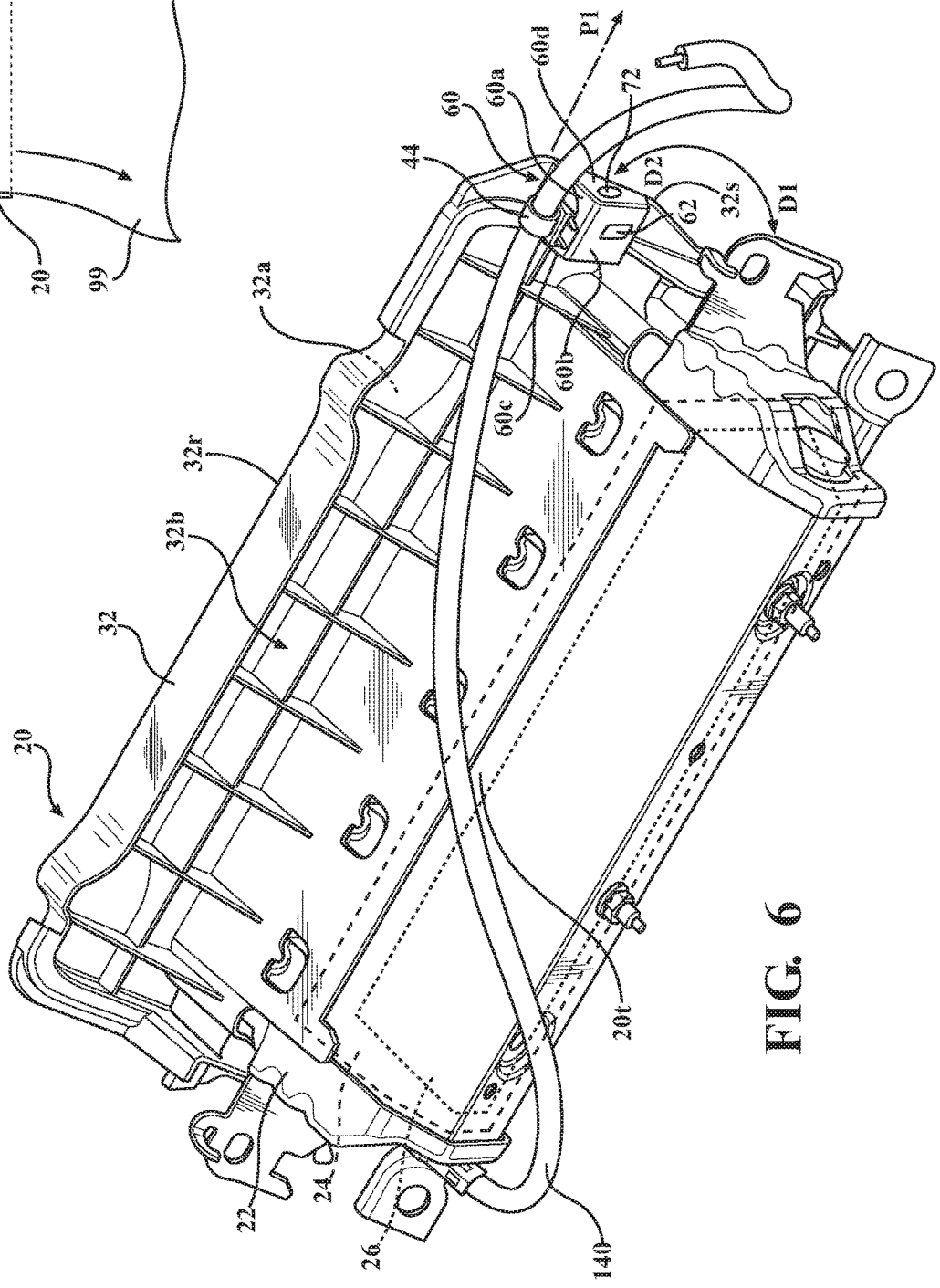
FIG. 6 is the schematic plan perspective view of FIG. 1 showing the mounting of a securement element in a securement element mounting hole, and also showing the guidance and securement of a wire harness exiting another portion of the housing.

The arrangement described herein also enables a wire harness exiting any portion of the housing 20 to be directed to and secured to a desired securement location on the housing. FIG. 6 shows an embodiment in which the wiring harness 140 connected to the inflator exits the housing 20 from an opposite side of the housing than shown in FIG. 1. The harness 140 may be directed across a top surface 20t of the housing 20 to the first securement element 44 mounted on the door 32 as previously described.

Figure 3:
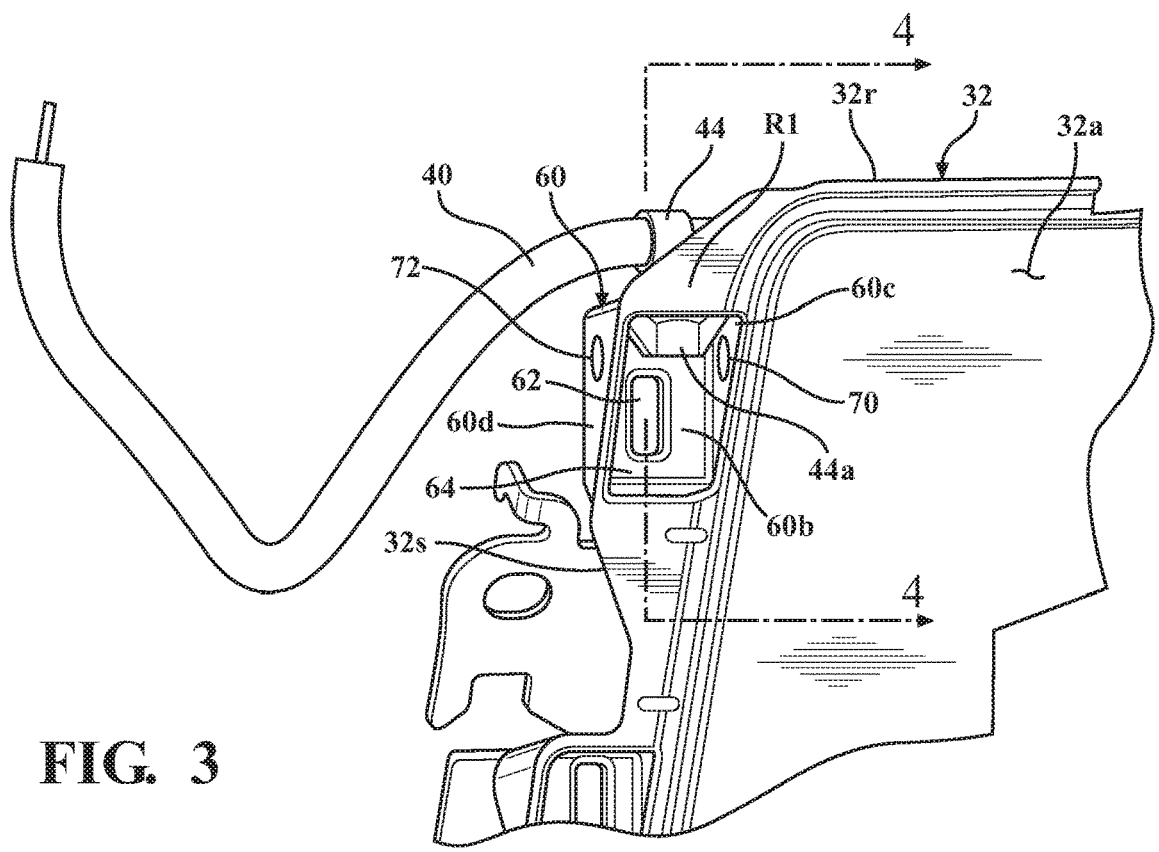
FIG. 3 is a schematic frontal view of a portion of the housing and securement element shown in FIG. 2.
Figure 4:
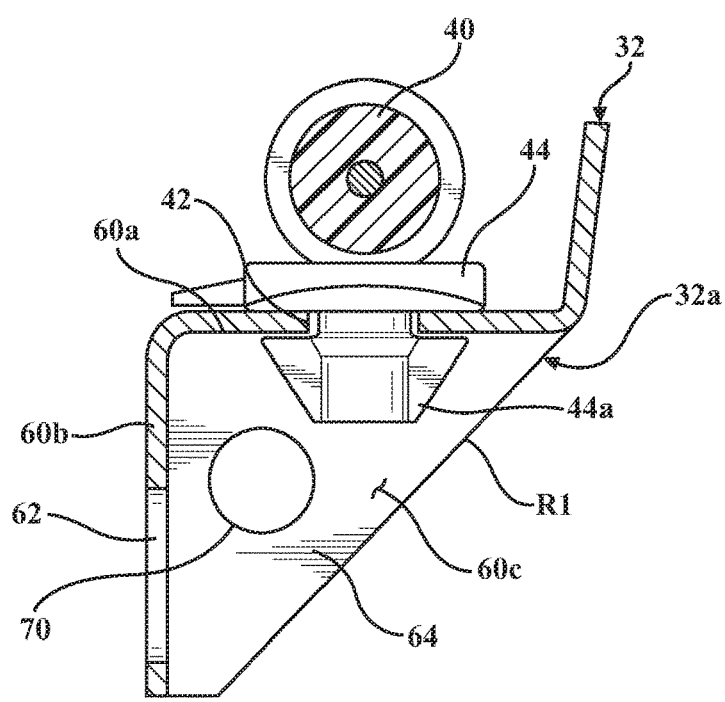
FIG. 4 is a schematic side cross-sectional view of a portion of the housing and securement element shown in FIG. 3.
Figure 5:
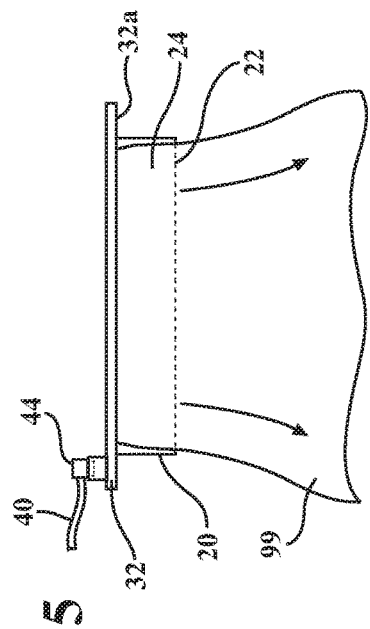
FIG. 5 is a schematic front view of a housing in accordance with an embodiment described herein mounted in a vehicle, with the housing door in an open condition and showing a spatial relationship between a deploying airbag and a securement element mounted in a securement element mounting hole of the housing door.

Because the first securement element mounting hole 42 is positioned adjacent a rearmost and outboard location on the housing door 32, a securement element 44 and an associated wiring harness, cable, or other element may be easily attached to the door 32 after the housing 20 has been installed in the vehicle. In addition, the provision of mounting holes along multiple sides of the mounting receptacle 60 also enables a securement element to be attached to the door 32 at any of a variety of different locations and orientations. In addition, multiple securement elements may be attached to the mounting receptacle 60, with each securement element secured in a different mounting hole. For example, a clip 44 as shown in FIGS. 3 and 4 may be mounted in first securement element mounting hole 42, while an eyelet (not shown) incorporating a flat-bottomed, self-tapping screw (not shown) could be inserted into one of the other mounting holes. The screw end of the eyelet and an associated wall of the receptacle may be dimensioned such that an end of the screw end does not project past the wall into the receptacle cavity 64, or such that the screw end does not project far enough into the receptacle cavity 64 to interfere with the portion 44a of the clip projecting into the cavity 64. The ability to attach multiple securement elements to the receptacle 60 enables multiple wires or other elements to be simultaneously secured to the housing 20 for various purposes.

Referring again to the drawings, in one or more arrangements, the receptacle 60 may further include (and receptacle cavity 64 may be further defined by) a third wall 60c extending between the first wall 60a and the second wall 60b. In addition, a third securement element mounting hole 70 may extend through the third wall 60c. The third securement element mounting hole 70 may be structured to enable another securement element to be mounted along the third wall 60c, and to enable a portion of the other securement element to extend through the third wall 60c into the receptacle cavity 64 as previously described.

Also, in one or more arrangements, the receptacle 60 may further include (and receptacle cavity 64 may be further defined by) a fourth 60d wall extending between the first wall 60a and the second wall 60b. In addition, a fourth securement element mounting hole 72 may extend through the fourth wall 60d. The fourth securement element mounting hole 72 may be structured to enable yet another securement element to be mounted along the fourth wall 60d, and a portion of the yet another other securement element to extend through the fourth wall 60d into the receptacle cavity 64 as previously described.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A housing for a knee airbag module, the housing comprising:
   an enclosure structured to receive a knee airbag module therein;
   a door rotatably coupled to the enclosure;
   a securement element mounting receptacle including a first wall extending from an interior face of the door in a direction toward an exterior face of the door, and a second wall extending from the door interior face in a direction toward the exterior face of the door and adjoining the first wall; and
   a first securement element mounting hole extending through the first wall.

2. The housing of claim 1 wherein the receptacle further comprises a second securement element mounting hole extending through the second wall.

3. The housing of claim 2 further comprising:
   a third wall extending between the first wall and the second wall; and
   a third securement element mounting hole extending through the third wall.

4. The housing of claim 3 further comprising:
   a fourth wall extending between the first wall and the second wall; and
   a fourth securement element mounting hole extending through the third wall.

5. A housing for a knee airbag module, the housing comprising:
   an enclosure structured for mounting a knee airbag module therein;
   a door rotatably coupled to the enclosure, the door having an interior face structured to face into the enclosure when the door is in a closed condition, and an exterior face opposite the interior face and structured to face in a direction away from the enclosure when the door is in the closed condition; and
   a securement element mounting receptacle formed in the door, the receptacle including a first wall extending from the door interior face in a direction toward the exterior face, a second wall extending from the door interior face in a direction toward the exterior face of the door and adjoining the first wall, and a first securement element mounting hole extending through the first wall.

6. The housing of claim 5 wherein the securement element mounting receptacle further comprises a second securement element mounting hole extending through the second wall.

7. The housing of claim 6 wherein the first securement element mounting hole is positioned at a location in the door structured to reside adjacent an outboard edge and a rearmost edge of the door when the door is in an open condition.

8. The housing of claim 1 wherein the first securement element mounting hole is formed in the door at a location in the door structured to reside adjacent an outboard edge and a rearmost edge of the door when the door is in an open condition.

* * * * *